(12) United States Patent
Stählin et al.

(10) Patent No.: US 10,841,975 B2
(45) Date of Patent: Nov. 17, 2020

(54) METHOD FOR IDENTIFYING REDUNDANTLY RECEIVED INFORMATION ITEMS, VEHICLE-TO-X COMMUNICATION SYSTEM AND USE OF THE SYSTEM

(71) Applicant: Continental Teves AG & Co. oHG, Frankfurt (DE)

(72) Inventors: Ulrich Stählin, Eschborn (DE); Thomas Grotendorst, Eschborn (DE); Richard Scherping, Liederbach am Taunus (DE)

(73) Assignee: Continental Teves AG & Co. oHG (DE)

( * ) Notice: Subject to any disclaimer, the term of this patent is extended or adjusted under 35 U.S.C. 154(b) by 494 days.

(21) Appl. No.: 14/370,156

(22) PCT Filed: Dec. 20, 2012

(86) PCT No.: PCT/EP2012/076400
§ 371 (c)(1),
(2) Date: Jul. 1, 2014

(87) PCT Pub. No.: WO2013/102575
PCT Pub. Date: Jul. 11, 2013

(65) Prior Publication Data
US 2015/0019076 A1 Jan. 15, 2015

(30) Foreign Application Priority Data

Jan. 6, 2012 (DE) .......................... 10 2012 200 157
Oct. 5, 2012 (DE) .......................... 10 2012 218 172

(51) Int. Cl.
*H04W 84/18* (2009.01)
*H04L 1/22* (2006.01)
(Continued)

(52) U.S. Cl.
CPC ............ *H04W 84/18* (2013.01); *B60W 30/09* (2013.01); *B60W 50/14* (2013.01); *G08G 1/093* (2013.01);
(Continued)

(58) Field of Classification Search
CPC ...... H04W 84/18; B60W 50/14; B60W 30/09; B60W 2710/18; B60W 2710/20;
(Continued)

(56) References Cited

U.S. PATENT DOCUMENTS 7,310,694 B2 * 12/2007 Han .................... H04L 12/6418
358/426.01
2003/0043739 A1 3/2003 Reinold et al.
(Continued)

FOREIGN PATENT DOCUMENTS

CN 102077642 A 5/2011
DE 10 2008 060 231 6/2009
(Continued)

OTHER PUBLICATIONS

German Search Report corresponding to application DE 10 2012 218 172.5, dated Nov. 13, 2012.
(Continued)

*Primary Examiner* — Bhavesh V Amin
(74) *Attorney, Agent, or Firm* — RatnerPrestia

(57) ABSTRACT

A method for identifying redundantly received information in which the information is contained in vehicle-to-X messages, one vehicle-to-X message comprising at least one item of information, a plurality of vehicle-to-X messages being received by a receiver, and at least one portion of a total number of items of information being received redundantly. The received items of information are entered into an information table and matched with one another before the received information is processed.

10 Claims, 1 Drawing Sheet

| # | 1st message | | | | 2nd message | | | | redundant |
|---|---|---|---|---|---|---|---|---|---|
| | Transmitter | Type | Time | Comm. path | Transmitter | Type | Time | Comm. path | |
| 1 | xyz | a | 13:20:15 | WLAN | xyz | a | 13:20:15 | RKE | yes |
| 2 | wxy | b | 13:19:17 | WLAN | | | | | no |
| 3 | vwx | a | 13:18:18 | ISM | vwx | a | 13:18:19 | Mobile radio | yes |
| 4 | uvw | b | 13:17:35 | Bluetooth | uvw | b | 13:17:35 | RKE | yes |

(51) Int. Cl.
*H04L 1/08* (2006.01)
*G08G 1/09* (2006.01)
*H04L 29/08* (2006.01)
*G08G 1/16* (2006.01)
*B60W 30/09* (2012.01)
*B60W 50/14* (2020.01)
*H04L 29/06* (2006.01)

(52) U.S. Cl.
CPC ............... *G08G 1/162* (2013.01); *H04L 1/08* (2013.01); *H04L 1/22* (2013.01); *H04L 67/12* (2013.01); *B60W 2710/18* (2013.01); *B60W 2710/20* (2013.01); *H04L 69/14* (2013.01); *H04L 69/18* (2013.01)

(58) Field of Classification Search
CPC ... H04L 67/12; H04L 1/08; H04L 1/22; H04L 69/14; H04L 69/18; G08G 1/162; G08G 1/093
See application file for complete search history.

(56) References Cited

U.S. PATENT DOCUMENTS

| | | | |
|---|---|---|---|
| 2009/0310608 A1* | 12/2009 | Chen | H04L 45/48 370/389 |
| 2010/0124196 A1* | 5/2010 | Bonar | H04B 7/0689 370/329 |
| 2010/0303048 A1 | 12/2010 | Stählin et al. | |
| 2011/0098877 A1 | 4/2011 | Stählin et al. | |

FOREIGN PATENT DOCUMENTS

| | | |
|---|---|---|
| DE | 10 2011 003 624 | 8/2012 |
| WO | 2009158227 A2 | 12/2009 |

OTHER PUBLICATIONS

International Search Report corresponding to application PCT/EP2012/076400 dated Apr. 5, 2013.
Second Chinese Office Action for Chinese Application No. 201280066361.5, dated Apr. 21, 2017, including English translation, 13 pages.

* cited by examiner

| # | 1st message | | | | 2nd message | | | | redundant |
|---|---|---|---|---|---|---|---|---|---|
| | Transmitter | Type | Time | Comm. path | Transmitter | Type | Time | Comm. path | |
| 1 | xyz | a | 13:20:15 | WLAN | xyz | a | 13:20:15 | RKE | yes |
| 2 | wxy | b | 13:19:17 | WLAN | | | | | no |
| 3 | vwx | a | 13:18:18 | ISM | vwx | a | 13:18:19 | Mobile radio | yes |
| 4 | uvw | b | 13:17:35 | Bluetooth | uvw | b | 13:17:35 | RKE | yes |

METHOD FOR IDENTIFYING REDUNDANTLY RECEIVED INFORMATION ITEMS, VEHICLE-TO-X COMMUNICATION SYSTEM AND USE OF THE SYSTEM

CROSS REFERENCE TO RELATED APPLICATIONS

This application is the U.S. National Phase Application of PCT International Application No. PCT/EP2012/076400, filed Dec. 20, 2012, which claims priority to German Patent Application No. 10 2012 200 157.3, filed Jan. 6, 2012 and German Patent Application No. 10 2012 218 172.5, filed Oct. 5, 2012, the contents of such application being incorporated by reference herein.

FIELD OF THE INVENTION

The invention relates to a method for identifying redundantly received information items in which the information items are comprised by vehicle-to-X messages, wherein a vehicle-to-X message comprises at least one information item, wherein a receiver receives a multiplicity of vehicle-to-X messages and wherein at least one component of a total number of the information items is received redundantly, and to a vehicle-to-X communication system, comprising:
a communication unit for receiving and sending vehicle-to-X messages,
an information table module for entering and erasing received information items into and from an information table, and
a matching module for matching information items entered into the information table, wherein and to the use thereof.

BACKGROUND OF THE INVENTION

The prior art already discloses vehicle-to-X communication systems that are designed to transmit both traffic-related data and various service data, such as entertainment applications. In this case, the vehicle-to-X communication is based both on the data interchange between vehicles themselves (vehicle-to-vehicle communication) and on the data interchange between vehicles and infrastructure devices (vehicle-to-infrastructure communication). Since, in addition, received vehicle-to-X messages are resent by their receivers within the context of what is known as a multihop method that is often used, in order to increase the effective range of the vehicle-to-X message in this way, there is usually no absence of one and the same vehicle-to-X message with the information items that it contains being received repeatedly redundantly by a receiver.

In this connection, DE 10 2008 060 231 A1, which is incorporated by reference, describes a method for selecting different data transmitted by means of vehicle-to-X communication. Using a data frame, the received data are distinguished from a data filter in the reception apparatus and are forwarded to a driver assistance system or an entertainment device, for example. This allows the received data to be sorted before they are actually processed. For the purpose of transmitting the data, transmission and reception devices based on the WLAN standards 802.11a/b/g/n at 2.4 GHz or the WLAN standard 802.11p at 5.9 GHz are used. In order to transmit the data redundantly and to increase the reliability of the transmission, simultaneous sending on both WLAN frequency ranges is also possible.

DE 10 2011 003 624 A1, which is incorporated by reference, describes a method for reducing the data utilization of a vehicle-to-X communication channel in which a vehicle-to-X message is transmitted in at least one first and a second message part via different communication channels. In this case, the first message part contains traffic-safety-relevant information, while the second message part comprises a security header and traffic-safety-relevant information items that are identical to the first message part to some extent. The component of a total message that is relevant to data integrity is therefore sent exclusively using the second message part, which keeps down the data volume of the first message part. The data integrity and reliability of the first message part can then be checked using the second message part by comparing the respective traffic-safety-relevant information items that both messages contain. If these information items match, the traffic-safety-relevant information items that exclusively the first message part contains are also trusted. Computational-intensive evaluation of a security header or decoding of the first message are therefore likewise not necessary.

The unpublished DE 10 2011 006 305, which is incorporated by reference, discloses a method for reducing the computation load for a data integrity check on data packets received by means of vehicle-to-X communication. In this case, the data integrity check comprises the checking of a signature encrypted by means of cryptographic algorithms, said signature being associated with a high level of computation complexity and requiring the use of dedicated electronics. In order to reduce the computation load, preprocessing of the received vehicle-to-X messages is first of all performed, which prioritizes said messages into different categories. In this case, the prioritization can be effected using different criteria, such as distance of the transmitter from the receiver or TTC (time to collision) of the transmitter with respect to the receiver. First of all, only the signatures of data packets provided with high priority are checked. If there is then still free computation capacity available, further data packets are checked. Similarly, the possibility of verifying the content of a data packet using ambient sensor data is described, which means that it is possible to dispense with checking the signature.

A common feature of all vehicle-to-X communication methods known in the prior art, however, is that preprocessing or presorting of received vehicle-to-X messages is geared exclusively toward reducing the computation power that needs to be applied for checking data integrity or for decoding. By contrast, no further consideration is given to processing of the vehicle-to-X messages by the respective vehicle systems that arises independently of the data integrity check. Provided that a vehicle-to-X message has been received repeatedly redundantly or an information item from a vehicle-to-X message is contained repeatedly redundantly in a plurality of vehicle-to-X messages received independently of one another, the relevant information item is likewise supplied to the respective vehicle system repeatedly redundantly, as a result of which said vehicle system needs to process the information item repeatedly in succession. This can bring about an unnecessary utilization level as far as overtaxing of the respective vehicle system.

SUMMARY OF THE INVENTION

An aspect of the present invention proposes a method that avoids unnecessarily redundant processing of information items redundantly received by means of vehicle-to-X communication.

According to an exemplary inventive method for identifying redundantly received information items in which the information items are comprised by vehicle-to-X messages, wherein a vehicle-to-X message comprises at least one information item and wherein a receiver receives a multiplicity of vehicle-to-X messages, at least one component of a total number of the information items is received redundantly. The method is distinguished in that the received information items are entered into an information table, and matched against one another, before the received information items are processed.

The entry into the information table and the matching of the entered information items result in the advantage that information items that have been received redundantly, for example by means of a plurality of vehicle-to-X messages, are identified as redundantly received and hence redundantly present. In this case, the information table allows listing and an overview of the received information items. Particularly in the case of what is known as a multihop method, in which received vehicle-to-X messages and the information items that they comprise are forwarded, that is to say resent, by the receiver directly, the method according to the invention is useful, since in this case, according to principle, a vehicle-to-X message that comprises identical information items is sent by a multiplicity of transmitters and hence is usually received repeatedly redundantly by the receivers. The identification of redundant reception of information items before they are processed allows effective steps to be undertaken in order to reduce computation power that is required for processing the redundant information items.

Preferably, the redundantly received information items are supplied to the processing in non-redundant form. This can avoid overtaxing or overload of the relevant driver assistance systems, since said driver assistance systems now need only process the information items once. A loss of information does not occur, however, since no information items that are present just once are retained, but rather exclusively information items that are present redundantly are processed just once.

In addition, preferably, the processing is effected by a driver assistance system, wherein the driver assistance system is designed particularly to execute an autonomous braking intervention and/or an autonomous steering intervention and/or a warning to a driver. Specifically in this case, the avoidance of overtaxing or overload of said driver assistance system through an unnecessary flood of information is of particular importance, since such driver assistance systems execute safety-critical functions.

Furthermore, the vehicle-to-X messages are transmitted via different communication paths. Hence, the inventive method is not exclusively limited to the identification of information items that have been transmitted via one and the same communication path. Since, in principle, a multiplicity of different communication paths are possible and are usually also used, the inventive method can advantageously be extended to these different communication paths. Furthermore, in this way, an information item entered into the information table can be augmented, if need be, when an information item received via another communication path is more detailed or more complete.

In particular, the different communication paths are based on at least one of the following connection types:
  WLAN connection, particularly based on IEEE 802.11p, WiFi Direct,
  ISM (Industrial, Scientific, Medical band) connection, particularly using a closing apparatus with radio connection capability,
  Bluetooth connection,
  ZigBee connection,
  UWB (Ultra Wide Band) connection,
  WiMax (Worldwide Interoperability for Microwave Access),
  Remote Keyless Entry connection,
  mobile radio connection, particularly GSM, GPRS, EDGE, UMTS and/or LTE connections, and
  infrared connection.

In this case, these connection types afford different advantages, depending on type, wavelength and data protocol used. Thus, some of the cited connection types allow a comparatively high data transmission rate and comparatively fast connection setup, for example, whereas others are, to the greatest possible extent, very well suited to data transmission around visual obstacles. The combination and simultaneous or parallel use of a plurality of these connection types result in further advantages, since in this way it is also possible to compensate for disadvantages of individual connection types.

Expediently, the received vehicle-to-X messages come from a multiplicity of different transmitters. Hence, by way of example, the flood of information that often arises within the context of a multihop method, for example, can be effectively prevented from leading to overload or overtaxing of a driver assistance system.

Preferably, the inventive method is distinguished in that the redundantly received information items are validated in the information table on the basis of their redundancy, particularly when they come from different transmitters. Hence, a simple opportunity arises for validating received information items without additional hardware complexity or at least without additional computation complexity.

Furthermore, it is advantageous that only a prescribed number of information items is entered into the information table. This ensures that the information table does not exceed a prescribed data and storage volume and hence all the information items entered therein continue to be matchable with an appropriate level of computation complexity.

In a further preferred embodiment of the invention, in the case of redundantly received identical information items the information item with the highest information resolution is entered into the information table and particularly is supplied to the processing, wherein already entered identical information items having relatively low information resolution are erased from the information table. In this case, the term information resolution describes a depth of detail for an information item within the context of the invention. By way of example, an information item about a vehicle involved in an accident that is now a traffic obstacle and hence a danger to the subsequent traffic can be described with different information resolution. In an embodiment with low information resolution, only the presence of the vehicle involved in the accident at a particular local position is described, for example. At higher information resolution, an identical information item additionally describes the type of accident, the number of persons at the accident location and the precise lane that the vehicle involved in the accident is in, for example. By virtue of exclusively the information item of a higher information resolution being entered into the information table and supplied to the processing, the best possible information resolution that exists is used. Usually, different information resolutions come about when information items or vehicle-to-X messages are transmitted via different communication paths that have different transmission bandwidths.

In addition, it is advantageous that the information items entered into the information table are assigned a holding period, wherein the entered information items are erased after the holding period has elapsed. This ensures that information items are held in the information table for no longer than they are probably needed, in order to avoid overloading or overtaxing a driver assistance system with a flood of information. Furthermore, this embodiment helps to prevent the data and storage volume of the information table from exceeding a prescribed degree.

In addition, it is particularly advantageous that the holding period of an information item entered into the information table is determined on the basis of the safety-relevant significance of said information item. By way of example, it is thus possible for an information item that prompts intervention in the vehicle control in the form of steering intervention or braking intervention to be held for longer than an information item that prompts the proposal of amended route guidance. This results in the advantage that overload or overtaxing of a safety-relevant driver assistance system by a flood of information is avoided particularly reliably.

Expediently, in the case of redundantly received information items the most recent received information item is entered into the information table, wherein an already entered earlier identical information item is erased from the information table. This results in the advantage that, by way of example, the holding period for the information item in the information table can be redetermined or extended on the basis of the time of reception or a timestamp that the vehicle-to-X message comprises.

An aspect of the invention also relates to a vehicle-to-X communication system that comprises a communication unit for receiving and sending vehicle-to-X messages, an information table module for entering and erasing received information items into and from an information table and a matching module for matching information items entered into the information table. The inventive vehicle-to-X communication system is distinguished in that the vehicle-to-X communication system executes the inventive method. The inventive system therefore comprises all the necessary apparatuses for executing the inventive method and executes said method. It therefore easily allows identification of redundantly received information items. This results in the advantages that have already been described.

Preferably, the communication unit and/or the matching module and/or the information table module comprise a common chipset and particularly a common electronic arithmetic and logic unit. This results in the advantage that not every one of the cited modules needs to be provided with a dedicated arithmetic and logic unit, which both simplifies the production process and reduces production costs. The common access of different modules to the same arithmetic and logic unit also results in effective and fast data linking for the modules.

Furthermore, an aspect of the present invention relates to the use of the inventive vehicle-to-X communication system in a motor vehicle.

BRIEF DESCRIPTION OF THE DRAWINGS

Further preferred embodiments will become evident from the subclaims and the description of an exemplary embodiment below with reference to figures, in which

DETAILED DESCRIPTION OF THE PREFERRED EMBODIMENTS

Figures 1, 2:
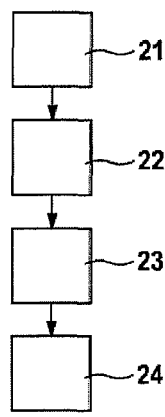
FIG. 1 shows a possible embodiment of the inventive information table.
FIG. 2 shows a flowchart for a possible sequence of the inventive method.

FIG. 1 shows information table 11 into which four received information items 12, 13, 14 and 15 have been entered. Information item 12 comes from transmitter "xyz" and is a safety-relevant information item, this being denoted by the categorization of the information item as type "a". Since information item 12 has been received twice (by means of "$1^{st}$ message" 16 and "$2^{nd}$ message" 17), it is present redundantly. The communication path used for "$1^{st}$ message" 16 was WLAN based IEEE 802.11p, and that used for "$2^{nd}$ message" 17 was an RKE-based radio connection. Since both vehicle-to-X messages comprise identical information items, have an identical time stamp "13:20:15", come from the same transmitter and additionally are both categorized as type "a", information item 12 is denoted as redundant. Information item 12 denoted as redundant is deemed to have been validated and is supplied to processing by the respective relevant driver assistance system only once. Since information item 12 received via WLAN and comprised by "$1^{st}$ message" 16 has a higher information resolution on account of the greater transmission bandwidth in comparison with RKE, information item 12 received via WLAN is in this case forwarded to the associated assistance system and processed thereby.

Information item 13 has been received only once by means of WLAN based on IEEE 802.11p. The transmitter of information item 13 is "wxy". Information item 13 is entered into information table 11 with the time stamp "13:19:17". Since matching against further received messages even from other transmitters does not result in a match with information item 13, the field "$2^{nd}$ message" 17 for information item 13 remains empty. Since the categorization with "b" is indicated and "b" represents non-safety-relevant information items, information item 13 is admittedly processed in a regular manner, but no further significance is attributed to it.

In addition, information item 14 is shown, which has been sent by transmitter "vwx", comprised by two successive vehicle-to-X messages, once with the time stamp "13:18:18" and once with the time stamp "13:18:19". A match reveals that the information items are identical. Information item 13 describes sharp braking by the transmitter "vwx" and is therefore categorized as type "a". "$1^{st}$ message" 16 has been received by means of ISM radio, "$2^{nd}$ message" 17 by means of mobile radio. Since "$2^{nd}$ message" 17 is more up to date than "$1^{st}$ message" 106, "$2^{nd}$ message" 17 is forwarded to the relevant assistance system for processing. In addition, message 14 is deemed to have been validated, since it is present redundantly.

Furthermore, information table 11 contains message 15, which comes from transmitter "uvw" and is categorized as type "b". Message 15 has been received with identical time stamp "13:17:35" once via Bluetooth and once via an RKE-based radio connection. Since information item 15 is therefore present redundantly, it is marked accordingly in information table 11, is deemed validated and is processed only once.

FIG. 2 shows a flow chart that is an exemplary embodiment of the inventive method. In method step 21, a receiver first of all receives a multiplicity of vehicle-to-X messages, which each comprise at least one information item. In step 22, the received information items are entered into an information table and matched against one another. According to the result of the match, the information items recognized as redundant are denoted in method step 23 as having been validated and the redundant information items are erased from the information table to the extent that each information item is now present only once. Finally, in step 24, the information items are forwarded to the relevant driver assistance systems and processed thereby.

The invention claimed is:

1. A method for identifying redundantly received information items in which the information items are comprised by vehicle-to-X messages for processing by a driver assistance system of a vehicle, the method including:
receiving, by a receiver in the vehicle, a multiplicity of vehicle-to-X messages, wherein the received vehicle-to-X messages originate from a multiplicity of different transmitters;
entering, by a processor of the vehicle, information items extracted from the multiplicity of vehicle-to-X messages into an information table in a memory device in the vehicle;
comparing, by a processor in the vehicle, the information items in the information table against one another, before the received information items are processed, to identify at least two redundant messages originating from at least two of the multiplicity of different transmitters;
choosing, by the processor in the vehicle, one of the at least two redundant messages having a highest information resolution;
supplying the message having the highest information resolution to the driver assistance system for processing, wherein in response to processing the message, the driver assistance system executes at least one of an autonomous braking intervention, an autonomous steering intervention, and a warning to a driver; and
erasing another message of the at least two redundant messages from the information table.

2. The method as claimed in claim 1, wherein the redundantly received information items are supplied to the processing in non-redundant form.

3. The method as claimed in claim 1, wherein the vehicle-to-X messages are transmitted via different communication paths.

4. The method as claimed in claim 3, wherein the different communication paths are based on at least one of the following connection types:
WLAN connection, particularly based on IEEE 802.11p, WiFi Direct,
ISM (Industrial, Scientific, Medical band) connection, particularly using a closing apparatus with radio connection capability,
Bluetooth connection,
ZigBee connection,
UWB (Ultra Wide Band) connection,
WiMax (Worldwide Interoperability for Microwave Access),
Remote Keyless Entry connection,
mobile radio connection, particularly GSM, GPRS, EDGE, UMTS and/or LTE connections, and
infrared connection.

5. The method as claimed in claim 1, wherein the redundantly received information items are validated in the information table on the basis of their redundancy.

6. The method as claimed in claim 1, wherein only a prescribed number of information items are entered into the information table.

7. A method for identifying redundantly received information items in which the information items are comprised by vehicle-to-X messages for processing by a driver assistance system of a vehicle, the method including:
receiving, by a receiver in the vehicle, a multiplicity of vehicle-to-X messages, wherein the received vehicle-to-X messages originate from a multiplicity of different transmitters;
entering, by a processor of the vehicle, information items extracted from the multiplicity of vehicle-to-X messages into an information table in a memory device in the vehicle;
comparing, by a processor in the vehicle, the information items in the information table against one another, before the received information items are processed, to identify at least two redundant messages originating from at least two of the multiplicity of different transmitters;
choosing, by the processor in the vehicle, one of the at least two redundant messages based on at least one of communication path, processing resources and timestamps;
supplying the chosen message to the driver assistance system for processing, wherein in response to processing the message, the driver assistance system executes at least one of an autonomous braking intervention, an autonomous steering intervention, and a warning to a driver;
assigning the information items entered into the information table a holding period; and
erasing the entered information items after the holding period has elapsed.

8. The method as claimed in claim 7, wherein the holding period of an information item entered into the information table is determined on the basis of the safety-relevant significance of said information item.

9. A vehicle-to-X communication system, comprising:
a communication unit in a vehicle for receiving and sending a multiplicity of vehicle-to-X messages, and
a processor in the vehicle configured to:
execute an information table module to enter information items extracted from the multiplicity of vehicle-to-X messages into an information table in a memory device in the vehicle, wherein the vehicle-to-X messages originate from a multiplicity of different transmitters;
execute a matching module for comparing the information items entered into the information table against one another to identify redundant messages originating from at least two of the multiplicity of different transmitters;
choose one of the redundant messages having a highest information resolution;
supply the message having the highest information resolution for processing; and
erase another message of the redundant messages from the information table.

10. A system as claimed in claim 9, at least one of the communication unit, the matching module, and the information table module comprise a common chipset and a common electronic arithmetic and logic unit.

* * * * *